I. H. SISSON.
MACHINE FOR MAKING HAIR PINS.
APPLICATION FILED NOV. 22, 1913.
1,162,952.
Patented Dec. 7, 1915.
9 SHEETS—SHEET 3.
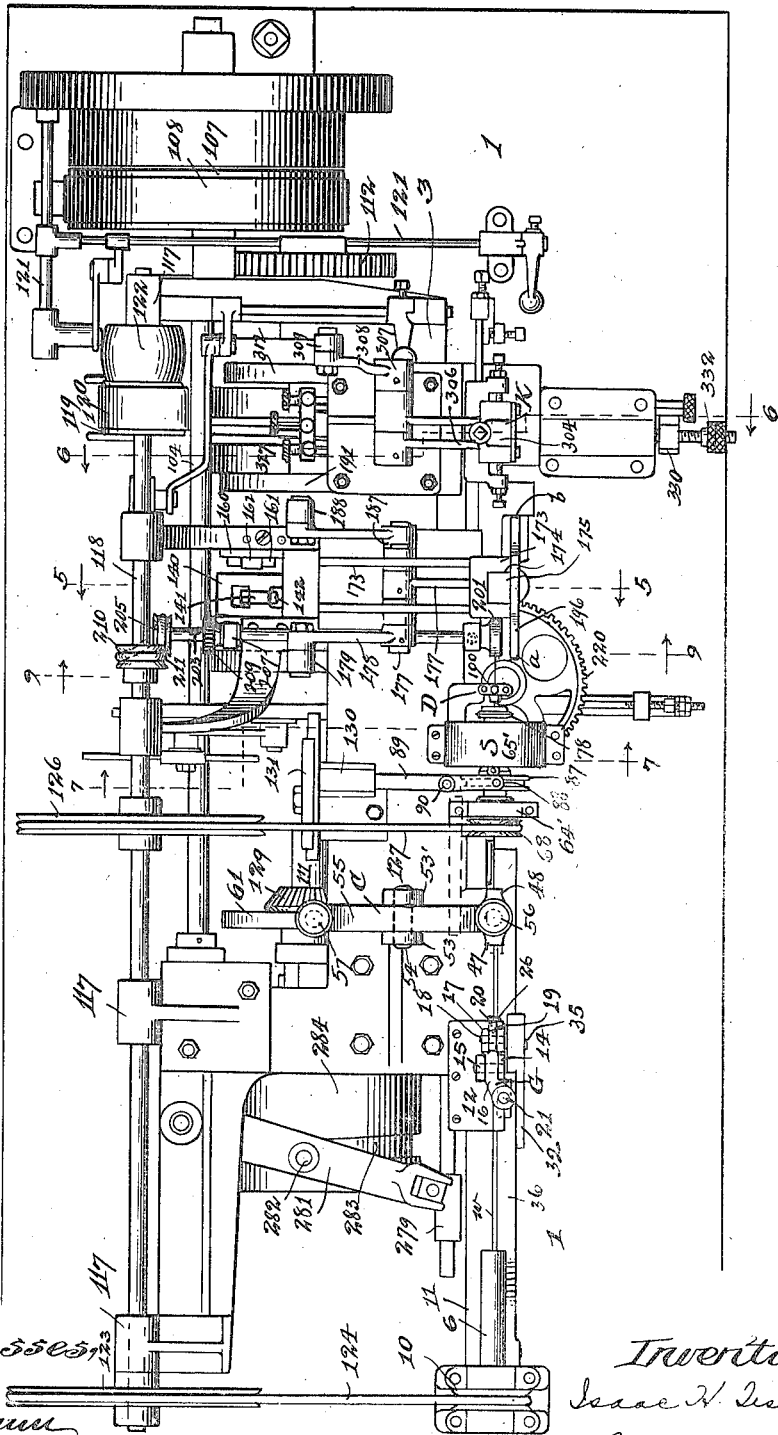

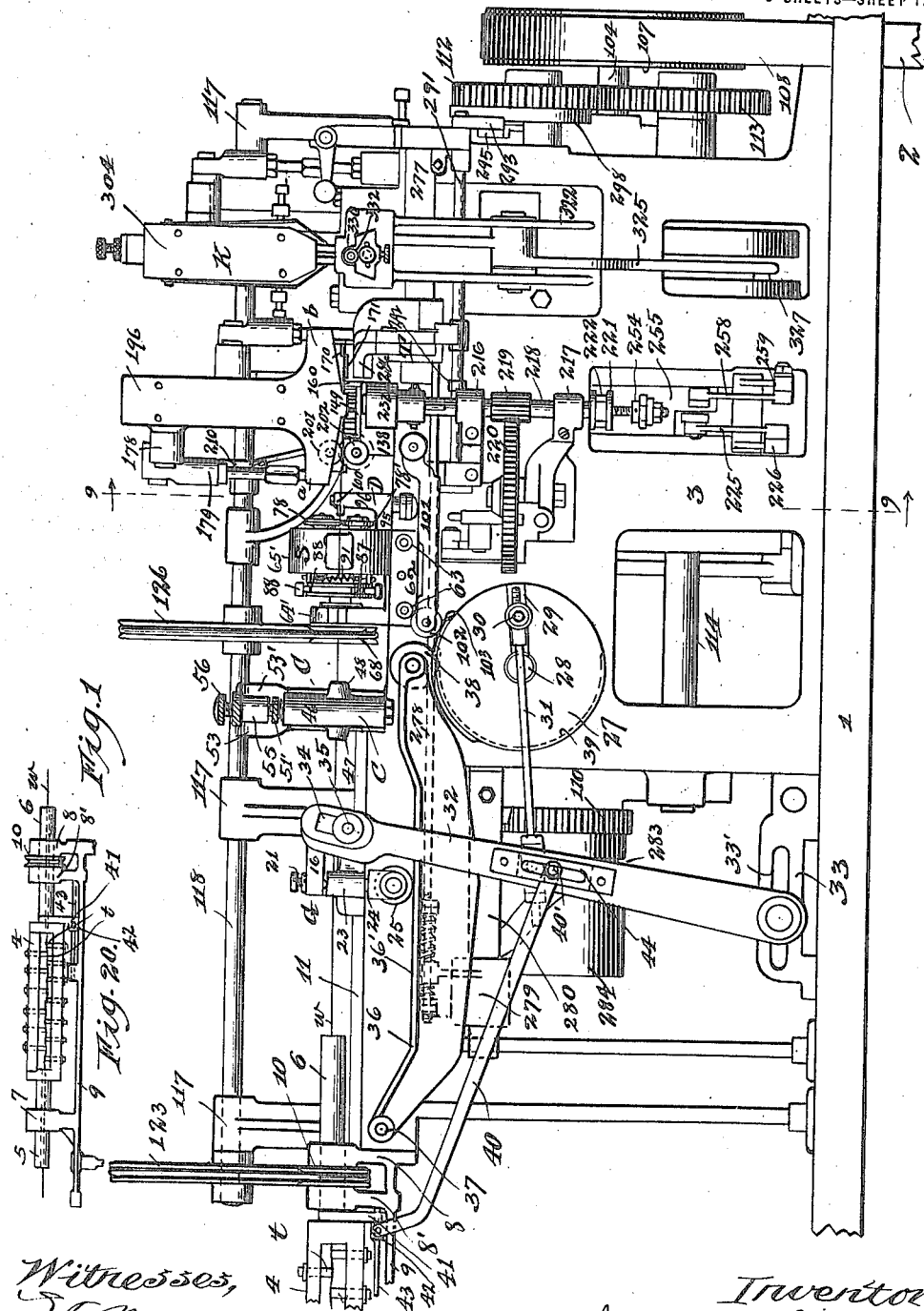

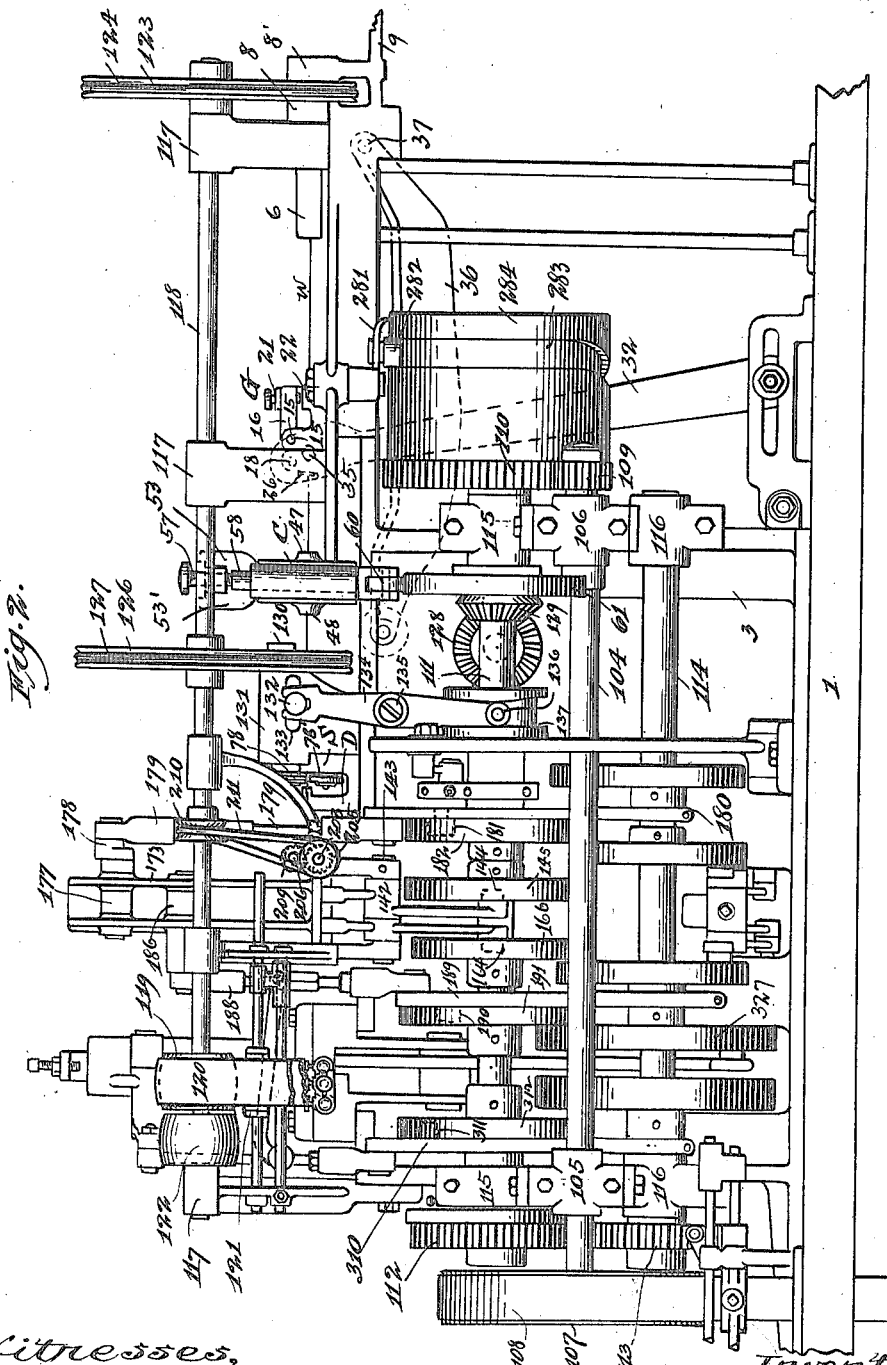

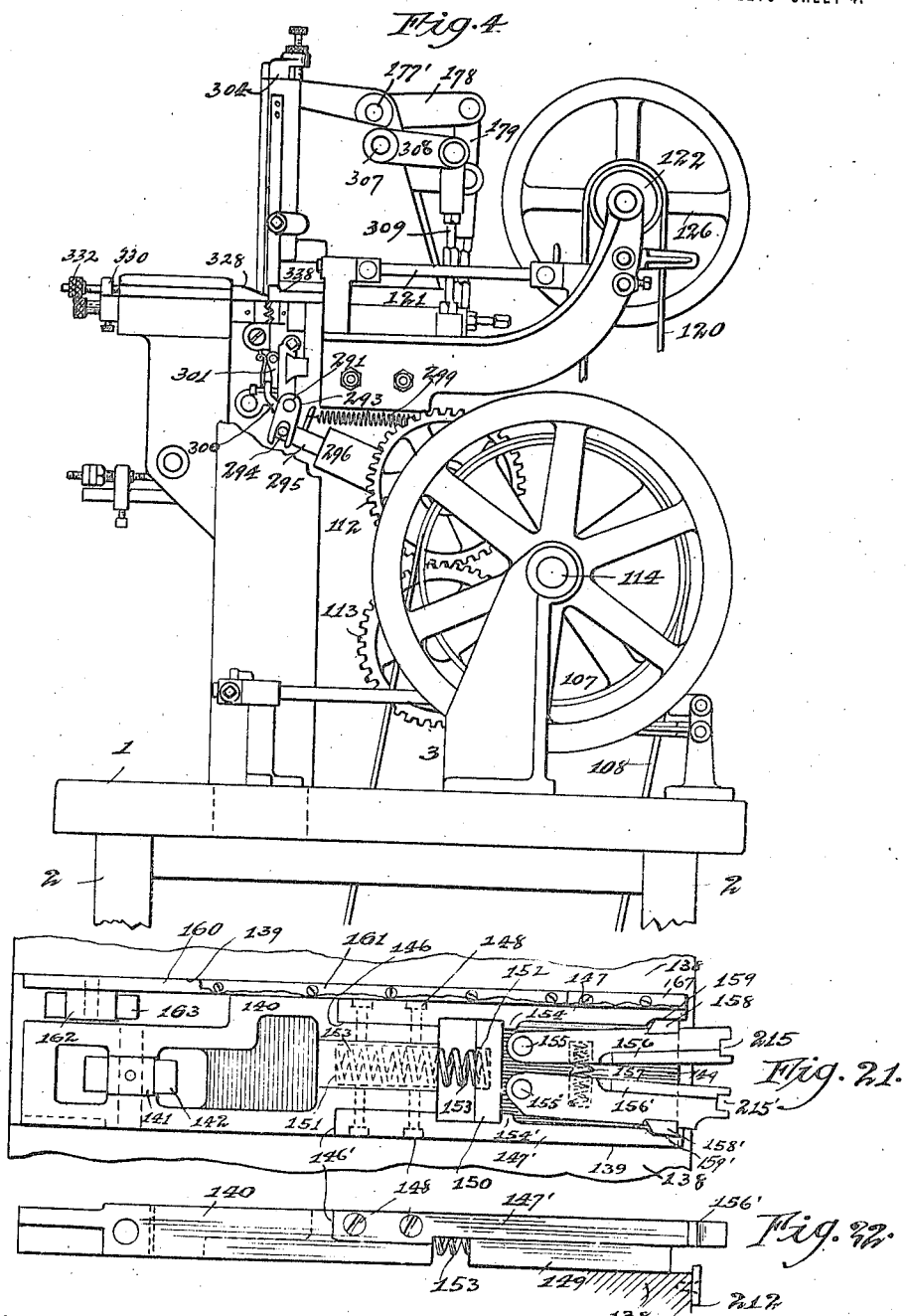

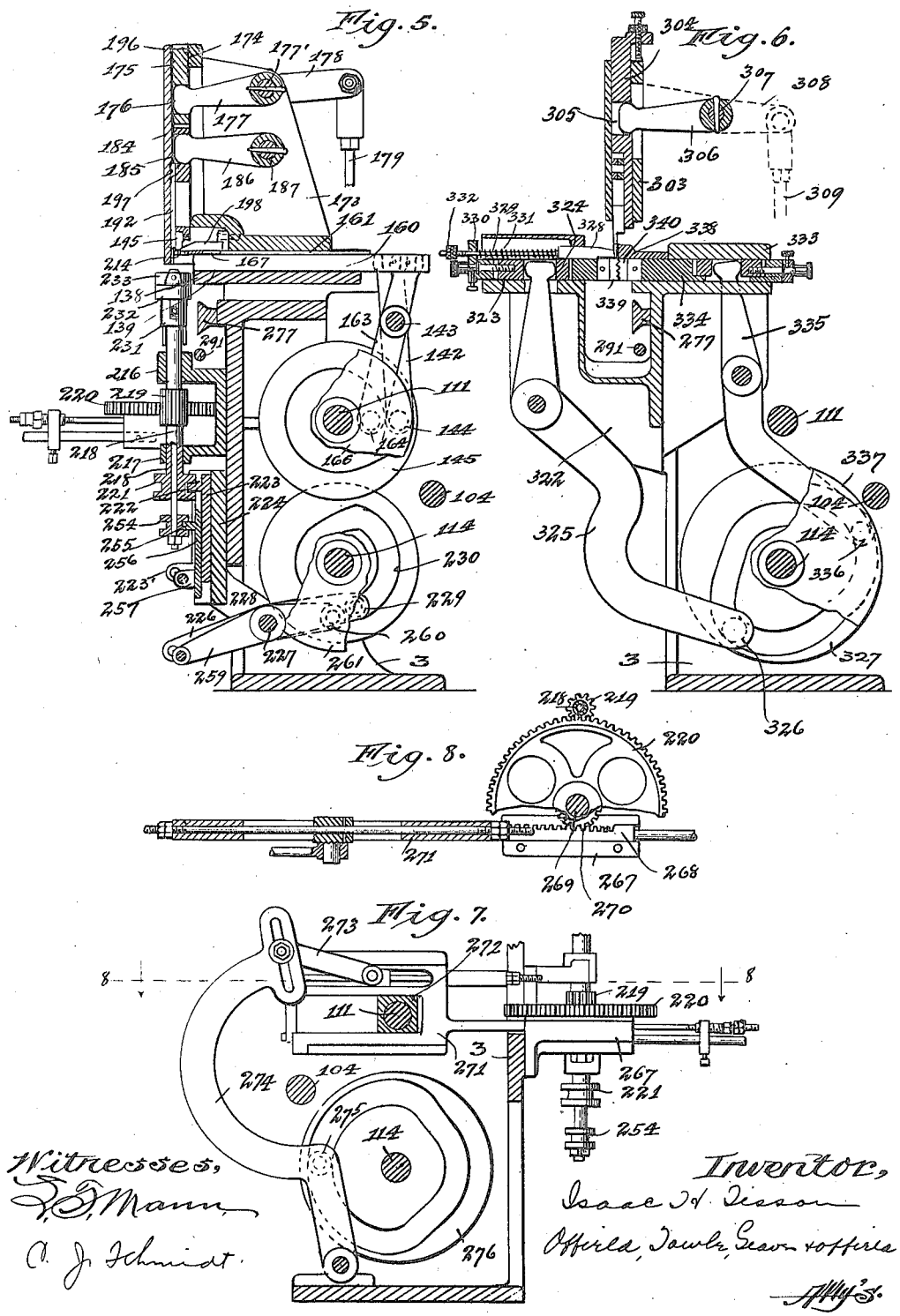

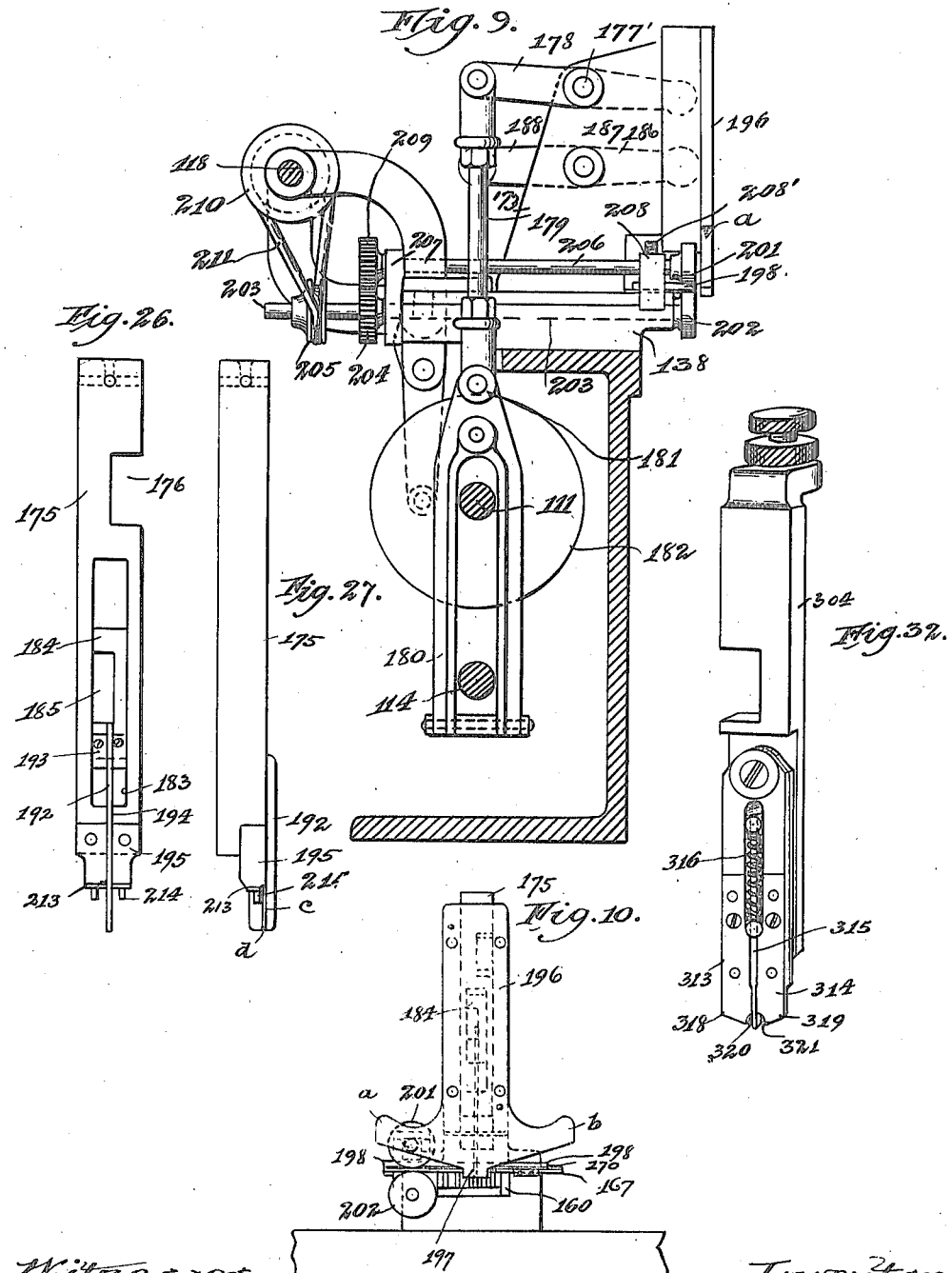

I. H. SISSON.
MACHINE FOR MAKING HAIR PINS.
APPLICATION FILED NOV. 22, 1913.
1,162,952.
Patented Dec. 7, 1915.
9 SHEETS—SHEET 7.
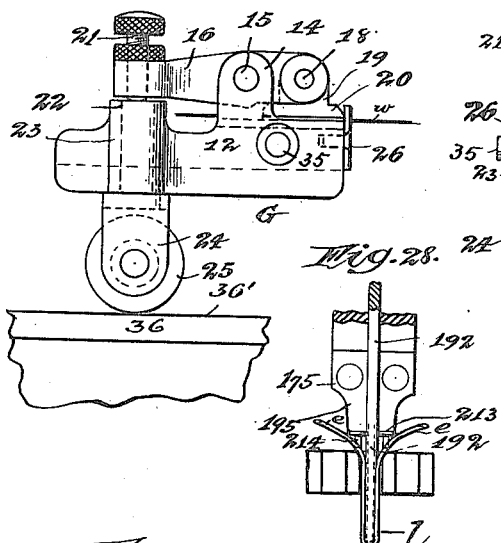
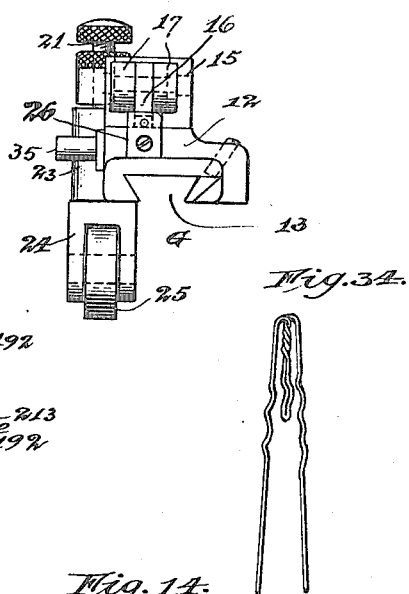
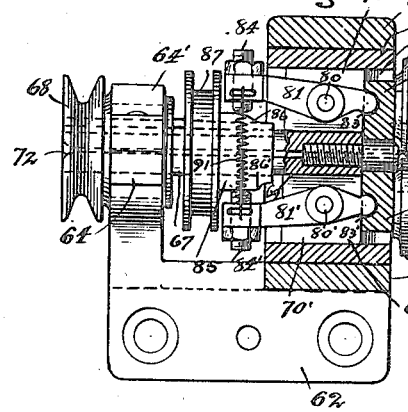
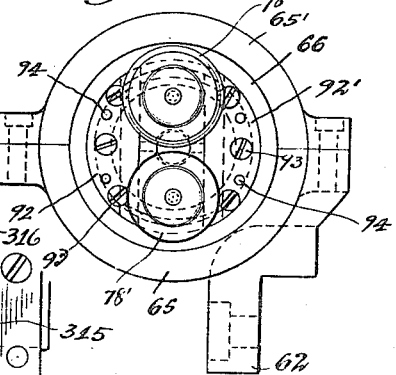

I. H. SISSON.
MACHINE FOR MAKING HAIR PINS.
APPLICATION FILED NOV. 22, 1913.

1,162,952.

Patented Dec. 7, 1915.
9 SHEETS—SHEET 8.

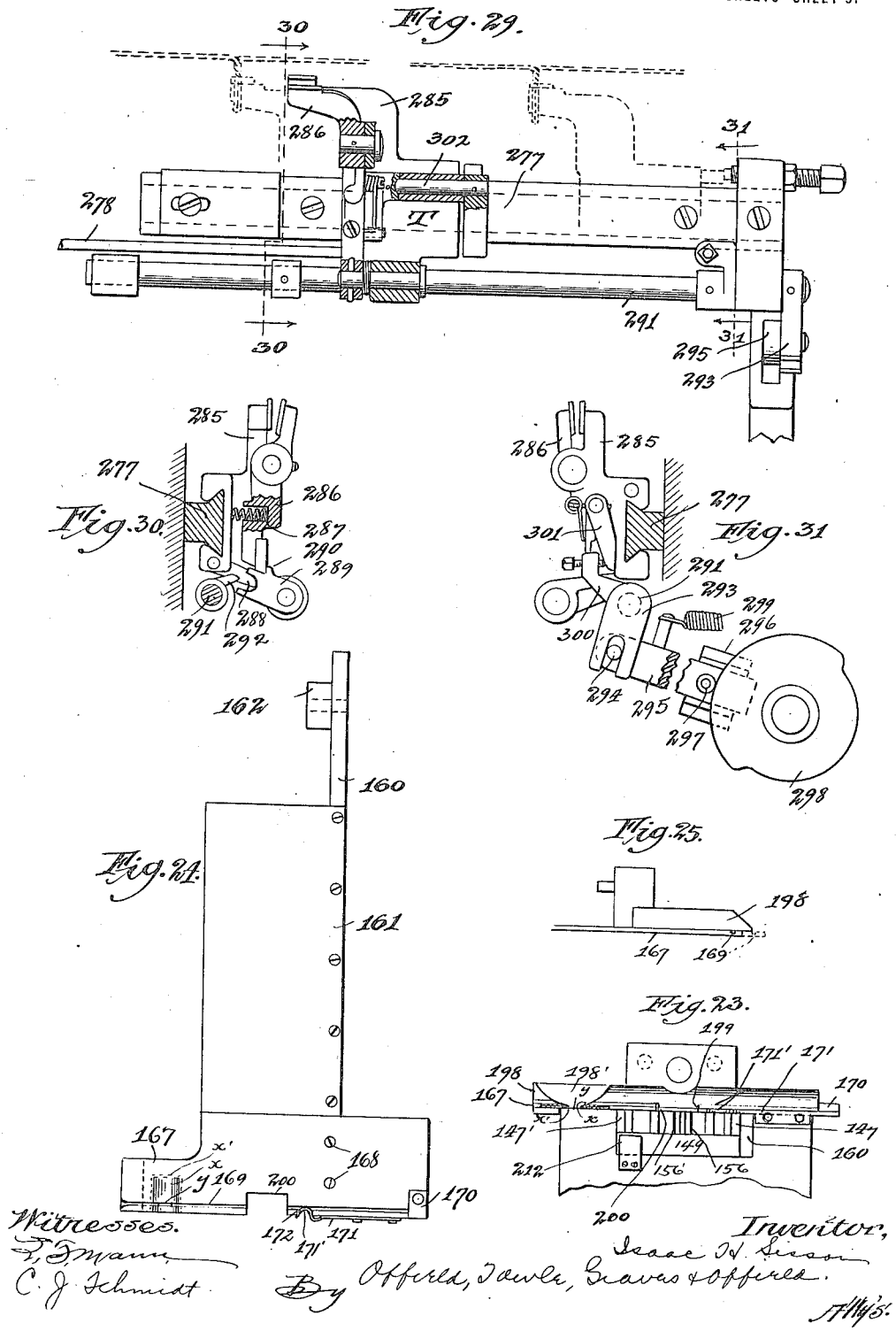

UNITED STATES PATENT OFFICE.

ISAAC HOWARD SISSON, OF PROVIDENCE, RHODE ISLAND, ASSIGNOR, BY MESNE ASSIGNMENTS, TO THE HUMP HAIRPIN MANUFACTURING COMPANY, OF CHICAGO, ILLINOIS, A CORPORATION OF WEST VIRGINIA.

MACHINE FOR MAKING HAIR-PINS.

1,162,952.   Specification of Letters Patent.   Patented Dec. 7, 1915.

Application filed November 22, 1913. Serial No. 802,347.

*To all whom it may concern:*

Be it known that I, ISAAC HOWARD SISSON, a citizen of the United States, and a resident of Providence, in the county of Providence and State of Rhode Island, have invented certain new and useful Improvements in Machines for Making Hair-Pins, of which the following is a specification.

My invention relates to machines for making hair-pins and among the important objects of the invention are to provide improved straightening mechanism for the wire from which the pins are made; to provide improved feed mechanism for feeding the wire into the operating fields; to provide improved cutter mechanism for severing the wire into lengths from which the pins are to be bent and formed; to provide improved and more efficient means for forming a loop in the wire length and for twisting the loops; to provide improved and simplified mechanism for driving the various operating elements; to provide improved means for adapting the machine and operating parts for making different sizes of pins from different gages of wire; and in general to provide improved construction and arrangement which will operate with greater smoothness, accuracy and efficiency in order that the output may be increased and the quality of the product greatly improved.

The various features of the invention are clearly illustrated in the accompanying drawings in which—

Figure 1 is a front elevational view, Fig. 2 is a rear elevational view, Fig. 3 is a plan view, Fig. 4 is an elevational view of the right end of the machine, Fig. 5 is a transverse sectional view taken on plane 5—5, Fig. 3, Fig. 6 is a sectional view on plane 6—6, Fig. 3, Fig. 7 is a transverse sectional view taken on plane 7—7, Fig. 3, Fig. 8 is an enlarged horizontal sectional view taken on plane 8—8, Fig. 7, Fig. 9 is a sectional view on plane 9—9, Fig. 3, Fig. 10 is an enlarged front elevational view of wire looping mechanism, Fig. 11 is an enlarged elevational view of wire feeding gripper, Fig. 12 is a side elevational view of such gripper, Fig. 13 is an enlarged front elevational view of wire cutting mechanism, Fig. 14 is an end elevational view of such cutting mechanism, Fig. 15 is an enlarged side elevational view of wire clamping structure, Fig. 16 is an enlarged front elevational view partly in section, of auxiliary wire clamping mechanism and the controlling cam therefor, Fig. 17 is a view of the top of the wire twister, Fig. 18 is a side elevational view of the twister head, Fig. 19 is a sectional view of the head on plane 19—19, Fig. 17, Fig. 20 is a reduced front elevational view of the wire straightener mechanism, Fig. 21 is an enlarged plan view of the slidable anvil structure for the looping mechanism, Fig. 22 is a side view of the anvil structure, Fig. 23 is an enlarged front view of the anvil structure and mechanism for guiding the wire thereover, Fig. 24 is a plan view of the wire guiding mechanism, Fig. 25 is an enlarged side view of the wire guiding mechanism, Fig. 26 is an enlarged front elevational view of the looping tongue supporting frame, Fig. 27 is a side view of the parts shown in Fig. 26, Fig. 28 is an enlarged front view of the lower end of the looping tongue structure and the anvil structure, Fig. 29 is an enlarged front elevational view partly in section of the carrier mechanism, Fig. 30 is a cross sectional view on plane 30—30, Fig. 29, Fig. 31 is a similar view taken on plane 31—31, Fig. 29, Fig. 32 is an enlarged front elevational view of the crowning dies and supporting frame, Fig. 33 is an enlarged view of the lower end of the crowning dies and the coöperating anvil structure for supporting the wire sections, and Fig. 34 shows the form of hairpin turned out by the machine.

The supporting bed frame 1 of the machine is mounted on suitable legs 2, the superstructure 3 on the bed frame serving to support the various shafts and other driving and forming appliances. The present machine cuts wire into sections, which sections are looped centrally, the loop then twisted, and the ends adjacent the loop bent downwardly to form the legs of the hairpin, the twisted loop sections and the upper ends of the legs being then crimped and humped. Referring to Fig. 1, the wire $w$ is fed to the wire straightener comprising the rectangular frame 4 from whose ends extend the trunnions 5 and 6 bored centrally to receive the wire $w$ which is engaged by the teeth $t$ of the straightener. The trunnions 5 and 6 are reciprocable in bearing brackets 7 and 8 on the supporting frame 9 secured to the machine superstructure so that the entire straightening frame is longitudinally reciprocable. Splined to the trunnion 6 between the bracket 8 and the auxiliary bracket 8′ is the pulley pinion 10 by means of which the wire straightener is rotated about the wire, and as will be explained later, the wire straightener is drawn toward the right by the wire (Fig. 1) and is positively returned to its left position by certain cam mechanism (Fig. 20). The wire is drawn through the straightener and intermittently fed toward the right end of the machine to the various forming devices. On the superstructure 3 below the path of the wire is a dovetailed guide way 11 on which the gripper G reciprocates. The construction of this gripper is clearly shown in Figs. 1, 11 and 12. The body 12 of the gripper has the dovetailed groove 13 in its under side for engaging the guide-way 11. Upstanding lugs 14 on the body 12 carry a transverse pivot shaft 15 for pivoting at an intermediate point the lever 16. The guide end of this lever is bifurcated to provide bearing lugs 17 for the pivot pin 18 which is engaged by the vertical stud 19 of the gripper foot 20. The front end of the lever 16 deflects forwardly and carries a vertical screw 21 forming an adjustable abutment for coöperating with the cam stud 22 reciprocable in the enlargement 23 and carrying at its lower end the pivot fork 24 for the cam roller 25. The wire passes from the straightener trunnion shaft 6 through the gripper G between the foot 20 and the gripper body and is guided through the gripper by passing through the hole in the guide plate 26 secured to the gripper end. When the cam roller 25 is raised the wire is clamped by the foot 20 and carried with the gripper toward the right of the machine and when the cam roller is allowed to drop the foot 20 is released from the wire in order that the gripper may travel toward the left to get a fresh hold on the wire. For controlling the reciprocation of the gripper and the opening and closing thereof, a disk 27 is provided, this disk being mounted on the front end of the transversely extending shaft 28. This shaft has the radially extending slot 29 in which a crank pin 30 is radially adjustable, one end of the rod 31 being pivoted to this pin and having its other end adjustably connected to the lever 32 which is pivoted at its lower end to a bracket 33. The upper end of lever 32 has the bearing slot 34 for the pin 35 extending forwardly from the gripper G. With this arrangement as the disk 27 rotates, the lever 32 will be swung laterally to effect reciprocation of the gripper G on its guide-way 11. The rod 31 having adjustable connection both with the crank pin 30 and the lever 32, and the lever 32 having adjustable pivot connection in the slot 33′ of bracket 33, the travel of the gripper can be adjusted to a nicety.

To control the opening and closing of the gripper jaw, a cam lever 36 is provided which is pivoted at its left end on a pin 37 extending from the machine frame, its right end journaling a cam roller 38 which coöperates with the peripheral cam surface 39 on the disk 27. The lever 36 has the upper straight surface 36′ which is engaged by the cam roller 25 on the gripper mechanism. The cam surface 39 is such that during substantially the entire travel of the gripper from left to right the surface 36′ is in the upper horizontal position to hold the cam roller 25 raised and to keep the foot 20 securely clamped to the wire so that the wire is drawn toward the right with the gripper, and then just before the gripper starts to return to the left the cam surface 39 allows the lever 36 to drop in order that the cam 25 may likewise drop and release the gripper foot 20 from the wire. The lever 32 is also used to control the reciprocation of the wire straightener. As before described, this straightener is free to reciprocate and is drawn toward the right with the wire. To effect restoration of the straightener toward the left the rod 40 connects with the lever 32 and the head 41 on the frame 9 which supports the reciprocating straightener. This head 41 straddles the trunnion shaft 6 and has the base 42 slidable between guide-ways 43 on the frame 9. During swing of the lever 32 toward the right the wire which is frictionally engaged by the straightening teeth will draw the straightener to the right, and then when the gripper is released from the wire and the lever 32 swings toward the left the rod 40 slides the head 41 to the left, and the head engaging against the straightener will restore the straightener to its outer position (Fig. 20). In order to obtain accurate operation, the inner end of rod 40 has adjustable connection with the lever 32, the pivot pin 40′ of the lever being adapted for longitudinal adjustment on lever 32 and to be secured in adjusted position to the slotted bracket 44 secured to the lever.

In order to hold the wire after it has been drawn inwardly by the gripper G, clamping mechanism C is provided. The construction of this clamping mechanism is clearly shown in Fig. 15. The mechanism comprises a frame 45 secured transversely to the machine at the inner end of the gripper guide-way 11. The front end of the frame is enlarged to form the sleeve 46 having the opposite guide extensions 47 and 48 having a central bore 49 through which the wire passes. Inserted in the lower end of the sleeve 46 is the anvil member 50 whose head 50′ extends into passageway 49 to form a seat for the wire. In the upper part of the sleeve 46 a plunger 51 is reciprocable and urged upwardly by a spring 52 engaging with the sleeve and the head 51' of the plunger. Extending upwardly on the body 45 and centrally thereof are the lugs 53 and 53' between which is pivoted on the pin 54 a walking beam or lever 55. The front end of this lever carries an adjustable abutment screw 56 for engaging the plunger 51 while the rear end of the lever carries an adjustable abutment screw 57 for coöperating at its lower end with the cam stud 58 which cam stud carries the fork 59 at its end which pivots the cam roller 60. When the cam roller is free the cam stud 58 will be released from the beam 55 and the spring 52 will swing this lever and will remove the lower end of the plunger 51 from the wire passing over the anvil head 50'. The cam roller 60 coöperates with the cam disk 61 and when the cam surface 61' reaches the roller it and the stud 58 will be raised to swing the lever 55 to depress the plunger 51 against the wire to thus securely clamp the wire. The position and extent of the cam surface 61' is such that the wire will be clamped and held during the outward movements of the gripper G and is released while the gripper is traveling inwardly.

As the wire is fed inwardly by the gripper mechanism and through the clamping mechanism it is first acted upon by the cutting mechanism S which cuts it into lengths each of which lengths is subsequently bent and transformed into a hairpin. The details of construction of this cutting mechanism are clearly shown in Figs. 1, 13 and 14. The U-shaped frame 62 is mounted on the machine frame structure and secured thereto by means of screws 63. This frame has the outer and inner lower bearing halves 64 and 65 engaged by detachable upper bearing halves 64' and 65' respectively, the bearing structure 65, 65' being lined by a bushing 66. A shaft 67 is journaled in the bearings and has secured to its left end the driving pulley 68. The right end of the shaft has secured thereto a head 69 having a bearing in the bushing 66. The shaft has the central bore 72 through which passes the wire, and detachably inserted in the right end of the shaft is the guide bushing 73 bored to the gage of the wire used. Slidable radially over the front face of the head 69 are the blocks 74 and 74' from which extend studs 75 and 75' mounting respectively the hubs 76 and 76', the hubs being held in place by washers 77 and 77' respectively. The hub 76 has an enlarged disk section 78 provided with the cutting ridge or edge 79, while the other hub has the enlarged disk section 78' whose periphery is straight and over which the wire passes. Extending through passageways 70 and 70' in the head 69 and pivoted therein on pins 80 and 80' are levers 81 and 81' whose right ends have rounded heads for engaging in sockets 83 and 83' in the blocks 74 and 74'. The left ends of the levers extend beyond the bearing structure 65, 65' and carry respectively radially extending abutment screws 84 and 84'. Splined to the shaft 67 to be longitudinally reciprocable thereon is a cam hub 85 whose outer end is of reduced diameter to provide cam inclines 86 and 86' respectively. Secured to the left end of the hub is a grooved collar 87 which is spanned by the forked end 88 (Fig. 3) of a rock lever 89 which is pivoted by means of pin 90 to the frame 62 immediately behind the collar. Upon rotation of the pulley 68, the grooved collar, the cam hub and the levers 81, 81' and the cutting member hubs 76 and 76' rotate bodily with the shaft 67, and while the wire is being fed toward the right by the gripper mechanism the lever 89 will be in position to hold the grooved collar and cam hub to the left to allow the springs 91 to draw the left ends of the levers 81 and 81' toward each other and to spread the right ends of the levers and the blocks 74 and 74' so that the cutting edge 79 is moved away from the wire passing over the disk 78', the wire being then free to move through the cutting structure. However, as soon as a length of wire has been shifted toward the right by the gripper mechanism and has been clamped by the clamping mechanism C, the lever 89 is rotated to shift the cam hub 85 toward the right to move the cam surface 86—86' along the abutment screws 84—84' to thus spread the outer ends of the levers and to cause the cutting edge 79 and disk 78' to approach each other gradually whereupon the wire is severed. It will be noted that the cam surface 86' acts slightly in advance of the surface 86 in order that the disk 78' may be brought against the wire before the wire is engaged by the cutting edge 79. Immediately after such severing of the wire the lever 89 is again swung in the opposite direction and the cam hub withdrawn to allow separation of the cutting disks. The supporting blocks 74—74' for the cutting members are dove-tailed and are held in place by the dove-tailed segmental plates 92 and 92' fitting into the right end of the bushing 66 and secured to the head 69 by screws 93, perfect fit and alinement being assured by pins 94 extending from the head and receiving the plates.

In order to further hold the wire when it is being cut and to hold the wire at the right of the cut preparatory to further treatment thereof, auxiliary clamping mechanism D is provided adjacent the wire cutting members. The construction and operation of this clamping mechanism is clearly shown in Figs. 1, 3 and 16. This attachment is in the form of an L-shaped frame 95 secured to the machine supporting structure, the vertical part having the sleeve 96 accommodating the plunger 97 which is urged downwardly by the compressed spring 98 within the sleeve and encircling the upwardly extending stem 99 of the plunger. The top surface 96' of the sleeve is in the path of the wire and forms a guide therefor while the upper end of the stem 99 carries a plate 100 above the wire. Pivoted to the front of the machine supporting structure at the right of the clamping attachment 95 is a cam lever 101 whose left end journals the cam roller 102 which coöperates with the cam surface 103 on the disk 27 (Fig. 1). The upper surface of the lever 101 is engaged by the lower end of the plunger 97 and the arrangement and adjustment are such that while the wire is carried toward the right with the gripper mechanism the lever 101 will be raised by the cam disk 27 to hold the plate 100 above the wire to allow free passage of the wire, and after feed of the wire and during return of the gripper toward the left the lever 101 will drop to allow the spring 98 to force the plunger 97 downwardly and to press the plate 100 against the wire whereby the wire is clamped, such clamping being simultaneous with the clamping of the wire by mechanism C already described.

Describing the driving arrangement for the mechanisms thus far referred to, a main drive shaft 104 is journaled in suitable bearings 105 and 106 (Fig. 2) and carries at its right end the driving pulley 107 connected by a belt 108 with any suitable driving shaft. The left end of this drive shaft carries a pinion 109 which meshes with a gear 110 on the upper cam shaft 111. At its right end this cam shaft carries a gear 112 which meshes with a gear 113 on the lower cam shaft 114, the shaft 111 being journaled in bearings 115—115 and the lower shaft 114 being journaled in bearings 116—116 (Fig. 2). At the top of the machine and journaled in bearings 117—117 is a shaft 118 having a pulley 119 by means of which it may be driven from any suitable source by belt 120, suitable belt shifting mechanism 121 being provided to shift the belt to and from the loose pulley 122. This shaft has secured to its left end a belt pulley 123 connected by belt 124 with the straightener mechanism driving pulley pinion 10 already referred to. The shaft 118 carries also a pulley wheel 126 connected by belt 127 with the driving pinion 68 of the wire cutting mechanism, which cutting mechanism has already been described. The shaft 28 carrying the disk 27, already referred to, which controls the swinging of the grip mechanism lever, carries at its rear end bevel pinion 128 which meshes with the bevel gear 129 secured to the upper cam shaft 111. This shaft 111 also carries the cam disk 61 which as already described is engaged by the cam roller 60 for the clamping mechanism C. The fork lever 89 which controls the spreading and closing of the cutter mechanism described is pivoted at its rear end to a cross head 130 slidably mounted in a guide bracket 131 secured to the machine supporting framework. This cross-head 130 has a pin 132 extending rearwardly through the slot 133 of the bracket and this pin is engaged by the upper forked end of a lever 134 pivoted intermediate its end to the machine supporting structure as indicated at 135, the lower end of the lever carrying a cam roller 136 which operates in the groove of the cam 137 secured to the upper cam shaft 111.

Describing now the mechanism for forming loops in the blanks, a transversely extending guide frame 138 is provided on the machine structure to the right of the cutting mechanism, this guide frame forming a transverse guide-way 139. In this groove a plate 140 is reciprocable, a pivoted block 141 serving to receive the forked end of the cam lever 142 pivoted intermediate its ends on a pin 143 supported at the back end of the guide frame 138 (Fig. 5). The lower end of this lever carries a cam roller 144 engaging in the cam groove of the cam disk 145, this cam disk being mounted on the cam shaft 111. The plate 140 has recesses 146 and 146' cut in its front end for receiving the rear ends of cam fingers 147 and 147', these fingers being secured to the plate in any suitable manner as by screws 148 (Figs. 21 and 22). In the front end of the guide-way 139 is a plate 149 which engages below the cam fingers 147, 147' and which at its rear end carries the upstanding lug 150 which engages between the cam fingers. In the opposed ends of the plate 140 and the lug 150 are pockets 151 and 152 respectively for receiving the helical spring 153, this spring tending to separate the two plates, the distance of separation being limited by stop extensions 154 and 154' on the respective cam fingers. Extending upwardly from the plate 149 adjacent its rear end are pivot pins 155 and 155' on which are pivoted at their rear ends the anvil members 156 and 156', these anvil members having opposed pockets for receiving a helical spring 157 which tends to spread the members apart. At their side edges near the front end thereof these anvil members carry small cam blocks 158, 158' while the ends of the cam fingers 147 and 147' are cut away at their inner faces to form recesses 159 and 159' for receiving the cam blocks when the plates 140 and 149 are separated. The rear ends of the cam blocks and recesses are beveled as shown so that when the two plates 140 and 149 are brought together the anvil members will be swung toward each other against the force of the spring 157.

Disposed in guide-way 139 to the right of the plates 140 and 149 is a bar 160 which carries a plate 161 over-lying the plates 140 and 149. The rear end of the plate 140 is cut away as indicated to leave room for a block 162 pivoted to the rear end of the bar 160, this block receiving the forked upper ends of cam lever 163 pivoted on pin 143 and carrying at its lower end a cam roller 164 for coöperating in the groove of the cam 166 mounted on shaft 111 (Figs. 2 and 5). Extending transversely over the front ends of the cam fingers 147 and 147' and in front of the plate 161 is an ejector plate 167 which is secured to the right hand cam finger 147 as by screws 168. Running along adjacent the front edge of the ejector plate is a guide groove 169 which, as will be later described, is normally in line with the wire coming from the cutting mechanism, the left entrance opening to the groove being well beveled. At the right end of the plate a stop piece 170 for the wire is secured and adjacent this stop piece a spring 171 is secured to the front edge of the ejector plate, its free rounded end 171' engaging in a notch 172 cut into the plate up to the guide channel therethrough, this spring acting against the wire to hold it in place against the stop piece after the wire has been cut by the cutting mechanism.

Mounted over the front end of the block 138 is a bracket 173 having the vertical guide-way 174 for receiving the frame 175 which has at its upper end a pocket 176 for receiving the rounded end of the arm 177 secured to the pin 177' journaled in the bracket 173 (Fig. 5), the pin having also the arm 178 secured thereto from which extends the connecting rod 179 terminating in the guide frame 180 which spans the shafts 111 and 114, the guide frame carrying a roller 181 engaging in the groove of the cam 182 on shaft 111 (Fig. 9).

The frame 175 has at its lower end the vertical compartment 183 in which a block 184 is vertically slidable, this block having a side pocket 185 for receiving the end of the arm 186 secured by pin 187 on bracket 173, the right end of the pin having secured thereto the arm 188 from which a connecting rod extends to a guide frame 189 spanning the shafts 111 and 114, this frame pivoting a cam roller 190 engaging in the groove of the cam 191 mounted on shaft 111 (Figs. 2 and 9).

The block 184 carries the loop forming tongue 192 secured thereto by strap 193, the tongue passing through the slot 194 provided in the bottom of the frame 175 and passing also through a slot provided in the die block 195 secured to the lower end of the frame 175. Detachably secured to the front of bracket 173 is a front plate 196 having on its inside a vertical slot 197 for receiving and guiding the loop forming tongue. Secured to the front of the bracket 173 below the guide-way 174 is a top plate 198 (Figs. 23 and 5) which overhangs the wire ejector plate 167, this top plate having a notch 199 cut in its front edge, and the ejector plate 167 having a notch 200 cut into its front edge, these notches being below the path of the looping tongue 192.

After the cutting operations the wire blanks are fed against stop piece 170 by upper and lower rollers 201 and 202 into the proper position for the loop forming operation. The lower roller 202 is secured to the front end of the shaft 203 journaled in the frame 173 and carries at its rear end the gear 204 and also a belt pulley 205 (Fig. 9). The upper roller 201 is secured to the front end of shaft 206 journaled in bearings 207 and 208 on frame 173, this shaft carrying at its rear end the gear 209 meshing with the gear 204. A pulley 210 on shaft 118 is connected by a belt 211 with the pulley 205, the rollers being driven to carry the wire from the cutting mechanism into the field of the looping mechanism. The rollers are adjusted vertically to be apart a distance slightly less than the diameter of the wire to be propelled, and a spring 208' acting on bearing 208 tends to press the upper roller against the wire, the wire being propelled by friction. The top plate 198 is grooved out and slotted as indicted at 198' to allow engagement of the top roller with the wire which passes below the top plate, the ejector plate having the upper and lower notches $x$ and $x'$ for accommodating the upper and lower rollers and the plate being perforated at $y$ at these notches and in register with the wire guide channel 169 in order that the rollers may engage the respective sides of the wire.

Before the wire lengths reach the looping field the bar 160 which carries the ejector plate is in its rearmost position, the wire guiding grooves in the ejector plate being in line with the wire coming from the cutting mechanism (Fig. 7). After the cutting operation the wire blank is propelled by the rollers 201 and 202 until the wire length strikes the stop piece 170 on the ejector plate, the wire length then lying in the groove of the ejector plate and being yieldingly held therein by the spring 171. The frame 140 carrying the cam fingers 147 and 147' and the plate 149 now move forwardly a distance until the plate 149 strikes an abutment piece 212 secured to the front end of the frame 138. The bar 160 which carries at its front end the ejector plate is now shifted forwardly until the wire guide channel is brought forwardly beyond the front edge of the top plate 198 (dotted lines Fig. 27) whereupon the wire is in the vertical plane of operation of the looping tongue and the front ends of the anvil members. The block 184 carrying the looping tongue is now shifted downwardly by its cam mechanism, the lower edge of the tongue engaging the wire length at its middle point and drawing the central part of the length downwardly between the front ends of the anvil members to form a loop $l$ (Fig. 28), the ends $e$ of the length adjacent the loop being swung upwardly against the upwardly inclined wings $a$ and $b$ at the lower end of the top plate 198, the lower end of the tongue being grooved on its sides and bottom to more accurately engage with the wire as indicated at $c$ and $d$, (Fig. 27). After the loop is thus formed the frame 175 is shifted downwardly by its cam mechanism and engages the upwardly deflected ends $e$ of the length and brings these lengths into horizontal position against the tops of the anvil members at the ends thereof, the die block 195 having a groove 213 cut in its front lower edge for receiving the wire and holding it in true horizontal position against the inner face of front plate 196 and the front ends of the anvil members 156 and 156'. When the looping tongue reaches its lowermost position and the loop has been formed the bar 160 is returned to carry the ejector plate back to its rear position and this plate is fully withdrawn before the wire is clamped by the die block 195. After withdrawal of the ejector plate and clamping of the wire the loop tongue is raised entirely out of the loop and shortly thereafter the plate 140 is shifted forwardly to carry the cam fingers 147 and 147' over the plate 149 to cause coöperation of the beveled cam surfaces at the front ends of the fingers and anvil members, the result being that the anvil members are swung together to compress the loop, that is, to bring together the two sections of wire adjacent the loop. The plate with the cam fingers moves forwardly over the plate 149 against the force of the spring 153 hereinbefore referred to. Substantially simultaneously with the raising of the looping tongue, loop twisting mechanism is raised into place to receive and to twist the loop, and at practically the same time carrier mechanism is started in operation toward receiving the length after looping and twisting. After the twisting operation the carrier mechanism will be in place to receive the twisted blank and after the blank has been received by the carrier mechanism the plate 140 together with the cam fingers will have been shifted rearwardly relative to the plate 149 to cause disengagement of the cam surfaces on the fingers and anvil members respectively to allow reopening of the anvil members. After such spreading of the anvil members the plate 149 will be returned with the plate 140 to the initial rear position. It will be noted that pins 214 extend from the lower ends of the die block 195 behind the groove 213. These pins are behind the wire after the looping operation and if for any reason the wire should have been broken during the looping operation, the wire pieces will be ejected from the machine when the anvil members are withdrawn. In order to receive these pins the front ends of the anvil members have vertical grooves 215 and 215'.

Describing now the twisting mechanism, upper and lower brackets 216 and 217 support a spindle 218 for rotational movement and vertical reciprocation, this spindle having substantially midway its ends a pinion section 219 meshing with a gear 220 which is driven in a manner to be described later. The lower end of this spindle carries a collar 221 for receiving the forked extension 222 on a plate 223 slidable in a vertical frame 224 secured to the supporting framework of the machine. A lug 223' extending from the lower end of this plate is connected by link 225 with the front end of a cam lever 226 pivoted on a pin 227 supported in the bracket 228 extending from the guide frame 224. The inner end of the lever has a cam roller 229 which engages in the groove of the cam 230 on the lower cam shaft 114. The spindle 219 is hollow and terminates in a head 231 over whose ends is fitted the cap 232. Secured to the top of the cap are two segmental plates 233 and 234 whose inner faces are beveled in order to form a diametrically extending dove-tailed guide-way 235. Slidable radially in opposite ends of this dove-tailed guide-way are two blocks 236 and 237 to whose inner ends are secured the inter-fitting L-shaped jaw heads 238 and 239 which at their center leave the vertical rectangular space $s$ for receiving the wire loop already referred to, these jaw heads being normally apart until the spindle has been raised and the loop received, whereupon the blocks 236 and 237 are brought to cause the heads to clamp the loop just prior to rotation of the spindle to twist the loop. The radial movement of the jaw blocks and heads is controlled by levers 240 and 241 pivoted on pins 242 and 243 extending through the cap 232, the rounded upper ends of the levers engaging in pockets 244 and 245 formed respectively in the jaw blocks 236 and 237. The lower ends of the levers extend into radial spaces 246 and 247 in the sleeve part 231 and carry adjustable abutment screws 248 and 249. The inner ends of these abutment screws are in the path of the rod 250 extending upwardly through the spindle, the upper end of this rod having a tapered cam shoulder 251 leading to the reduced end 252. When the rod 250 is in its upper position the end 252 will be between the inner ends of the abutment screws 248 and 249 in order that the jaw blocks and heads may be forced apart by the springs 253 between the jaw heads. When, however, the rod is moved upwardly the lower ends of the levers 240 and 241 are swung apart by the engagement of the cam surface 251 with the abutment screws and the upper part 250' of the rod comes between the abutment screws so that the clamping blocks and heads are brought together to securely clamp and hold the loop during the twisting operation. The lower end of the rod has a grooved collar 254 engaged by the forked extension 255 on the plate 256 which reciprocates vertically in the frame 224 over the plate 223. The lower end of the plate 256 has the extension 257 connected by link 258 with the front end of cam lever 259 pivoted on the pin 227, the inner end of this lever carrying a cam roller 260 which engages in the groove of cam 261 mounted on the lower cam shaft 114. When the looping tongue is being raised the cam 230 first operates to shift the spindle 218 upwardly to carry the spindle jaws toward the loop to receive the loop in the space s between the jaw heads 238 and 239. After the loop is thus received the rod 250 which is normally down is raised by the operation of the cam mechanism 261 and the levers 240 and 241 are actuated by the upper end of the rod to cause the jaw blocks and heads to come together to securely clamp the loop. After such clamping of the loop the gear 220 is driven to rotate the spindle in a positive direction thereby causing twisting of the loop, and after such twisting operation the cam 261 becomes effective first to cause lowering of the rod 250 thereby to allow opening of the jaw blocks and heads to release the loop, whereupon cam 230 also becomes operative and the entire twisting mechanism is restored to its lower position.

In order to discharge any pieces of wire that might remain in the twisting jaws after a twisting operation, due to break of the wire, I provide an ejector tongue 262 for passing through the loop receiving space. This ejector tongue extends from the end of a yoke 263 mounted on the upper ends of vertical rods 264 and 265 extending through the head 231 of the spindle, and when the spindle is dropped these rods engage with the upper spindle journaling bracket 216 so that upon further downward movement of the spindle the tongue 262 will enter the loop space s to eject any pieces or particles of wire that might remain in the space after the looping operation. In order to prevent any particles or dirt from entering between the jaw heads 238 and 239 a guard plate 266 is secured to one of the jaw heads to extend over both jaw heads and the space therebetween.

The mechanism for controlling rotation of the spindle rotating gear 220 is clearly shown in Figs. 1, 3, 7 and 8. Extending forwardly from the machine supporting frame-work is a guide bracket 267 in which a rack 268 is reciprocable, the shaft 269 which supports the spindle driving gear 220 carrying a pinion 270 to be engaged by the rack. The rear end of the rack terminates in a guide frame 271 slidable on the block 272 on the upper cam shaft 111. A link 273 pivoted to the frame 271 has adjustable pin and slot connection with the cam lever 274 which lever is pivoted at its lower end to the machine supporting frame and carries a cam roller 275 coöperating with the groove in cam 276 on the lower cam shaft 114 (Fig. 7). The adjustment of the cam mechanism is such that at the proper time the spindle will be rotated to twist the loops in the wire lingths.

After the looping and twisting operation the carrier mechanism conveys the twisted blanks to the crowning mechanism. The carrier mechanism is illustrated in Figs. 1, 2, 3, 4, 29, 30 and 31. The carrier T is slidable longitudinally on the guide rail 277 secured to the front of the machine structure to the right of the looping and twisting mechanism. A rod 278 extends toward the left from the carrier and has yielding spring connection at its other end with the block 279 shiftable on the guide bar 280 (Fig. 1). A cam lever 281 pivoted at its rear end to the machine supporting structure (Fig. 3) is engaged at its forked front end with the block 279 and at an intermediate point carries a cam lever 282 engaging in the cam groove 283 of the cylindrical cam 284 mounted on the upper cam shaft 111, this cam adjustment being such that the carrier is shifted longitudinally at the proper time to coöperate with the looping and twisting mechanism and with the crowning mechanism.

The carrier has a stationary jaw member 285 and the pivoted jaw member 286 between which and the carrier body is interposed a spring 287 tending to hold the upper ends of the jaws together. Extending forwardly from the lower end of the carrier body is a bracket 288 to which is pivoted a spring resisted detent latch 289 having the abutment 290 for receiving the lower end of the pivoted jaw member 286 to hold this jaw member in open position. The rock shaft 291 extending parallel with the direction of travel of the carrier has a trip dog 292 secured thereto for engaging at the proper time with the latch 289 to effect release of the pivoted jaw member to thus allow closure of the jaws. The trip dog 292 is mounted on the shaft 291 adjacent the looping mechanism, and at its outer end the shaft carries a forked arm 293 engaged by pin 294 on the cam slide bar 295, this cam bar being shiftable on a frame 296 on the machine supporting structure and carrying a cam roller 297 for coöperating with the cam 298 on the cam shaft 111, a spring 299 tending to hold the roller in engagement with the cam. The outer end of shaft 291 also carries the dog 300, adapted upon rotation of the shaft 291 to engage with the trip finger 301 when the carrier T is at the outer end of its guideway 277, this trip finger having connection by shaft 302 with the pivoted jaw member. Fig. 31 shows the dog and finger in engagement, the pivoted jaw being swung to open position in order that the latch 289 may swing upwardly to carry its abutment 290 in front of the lower end of the pivoted jaw member as shown in Fig. 30. While the twisting operation is taking place the cam 284 becomes effective to shift the carrier to within a short distance of the looping mechanism (full lines Fig. 29), the carrier then remaining stationary until the conclusion of the twisting operation, and then while the twisting spindle is retreating the carrier is advanced until its open jaws receive the lower end of the twisted loop on the length held below the looping mechanism, as illustrated in dotted lines at the left of Fig. 29. When the carrier is in this position its detent latch 289 will be in register with the dog 292 on the shaft 291 and this shaft is then rotated by the operation of cam 298 so that the latch 289 is rotated by the dog to release the open jaw member and to allow closure of the jaws to clamp the twisted loop wire length, this length being released from its holding mechanism when thus received by the carrier. The cam 284 then becomes effective to shift the carrier to its outer end (dotted lines Fig. 29), to convey the wire length supported thereby into the field of operation of the crowning mechanism, and after delivery of the wire length to the crowning mechanism the cam 298 again becomes effective to rock the shaft 291 to cause the dog 300 to engage with the trip finger 301 to effect opening of the jaws and release of the wire blank, the pivoted jaw member being then again held in open position by the latch arm 289, the carrier being then ready to be again shifted toward the looping mechanism to receive another looped length.

The crowning mechanism K is clearly illustrated in Figs. 1, 3, 4, 6, 32 and 33. The vertical guide frame 303 accommodates a plunger 304 which has the pocket 305 for receiving the front end of arm 306 extending from shaft 307, this shaft having also the arm 308 connected by rod 309 with a guide frame 310 straddling the shafts 111 and 114, the guide frame having a cam roller 311 engaging with the cam 312 on shaft 111. The plunger 304 has two downwardly extending arms 313 and 314 pivoted to its front face and carries between these arms the tongue 315, a spring 316 tending to hold the tongue down. The arms 313 and 314 carry at their lower ends the crowning dies 318 and 319 having their inner lower edges cut away to leave semi-circular crowning pockets 320 and 321, the tongue 315 terminating at the outer ends of these pockets as clearly shown in Fig. 32. The bracket 322 on the machine supporting structure forms a transverse guide-way 323 at its top for a block 324, this block being engaged by the upper end of cam lever structure 325 whose lower end carries the cam roller 326 coöperating with cam 327 on the lower cam shaft 114. Reciprocable on top of the block 324 is the anvil 328 whose stem 329 extends through the lug 330 at the front end of the block 324, a spring 331 encircling the stem between the anvil and lug, and the abutment nuts 332 at the outer end of the stem limiting the inward movement of the anvil by the spring with reference to the block 324. At the rear of the vertical line of crowning plunger is the guide frame 333 carrying the block 334 which is reciprocated in said frame by the cam lever mechanism 335 having the cam roller 336 engaging in cam 337 on cam shaft 338. Stationarily mounted on the frame 333 is the stop block 338 for the anvil 328. Normally the cam mechanisms 327 and 337 are in such position that the blocks 324 and 334 are separated and the anvil 328 held away from stop block 338 in order that the carrier T may bring a looped and twisted wire length into position in front of the stop 338 ready for the crowning operation. As soon as the carrier comes to this position the cam 327 operates to shift the block 324 inwardly until the anvil 328 yieldingly abuts against the stop block 338, the front of the anvil, as shown in Fig. 33, being bifurcated in order to receive between its legs the twisted loop of the wire blank. The cam 312 then becomes effective to effect downward shifting of the plunger 304 to bring the crowning dies against the horizontally extending wire length ends and to deflect these ends downwardly as illustrated in Fig. 33. Before such downward deflection the carrier T will have begun its travel to the left to receive another wire length.

After the crowning and deflecting operation the hairpin legs are crimped and the tongue humped to give the pin the final shape shown in Fig. 34. The crimping and crowning dies 339 and 340 are carried respectively at the inner ends of the blocks 324 and 334, and after the crowning operation the cams 327 and 337 operate to bring the blocks and dies together to form the crimps and humps, further operation of the cams resulting in return of the blocks to their outermost positions whereupon the anvil 328 is eventually withdrawn from the bends of the pin and the pin released into a suitable receptacle.

The machine described is entirely automatic in its operation, the wire being fed into the machine through efficient straightening mechanism, then cut into suitable lengths, then looped and the loop twisted, then crowned, and perferably crimped and humped. By providing interchangeable guide members, anvil members, and die members, the machine can be adapted for making pins from wire of different gage; and by means of the efficient adjustments provided for the various operating parts, the machine can readily be adapted for turning out pins of different sizes. All the mechanisms work smoothly and uniformly, thus insuring an improved product and an increased output.

As changes and modifications are possible which would still come within the scope of the invention, I do not desire to be limited to the details of construction shown except as set forth in the appended claims, which are as follows:

1. In a machine for making hairpins, the combination with wire operating fields, and feed mechanism for intermittently conveying wire to said operating fields comprising a guide-way, a frame slidable on said guide-way, a clamping lever pivoted to said frame and having jaws through which the wire passes, a cam stud coöperating with said lever, means for reciprocating said frame on said guide-way, a cam lever pivoted at one end and extending below the path of travel of said frame and having a cam roller at its other end, a cam disk with which said cam roller coöperates, the cam stud of said frame engaging with the upper surface of said cam lever, said cam being adjusted to raise said cam lever to hold its upper surface in horizontal position during travel of the feed mechanism toward the operating fields, the cam stud of said feeding mechanism being engaged by said horizontal surface during such travel and the jaws being closed to clamp the wire, said cam being operative during return movement of the clamping mechanism to lower the cam surface whereby to effect lowering of the clamping mechanism cam stud and release of the jaws from the wire.

2. In a machine for making hairpins, the combination of a plurality of wire operating fields, feeder mechanism for intermittently feeding wire to said operating fields comprising a guide-way parallel with the path of the wire, a frame slidable on said guide-way, means for effecting reciprocation of said frame on said guide-way, clamping jaws on said frame through which the wire passes, a cam roller having connection with said clamping jaws and adapted to be vertically reciprocated to effect opening and closure of said jaws, a cam member having a guide surface for said cam roller, and cam mechanism for effecting vertical reciprocation of said cam member and for holding said cam member in upper position during travel of the carrier mechanism toward the operating fields whereby said cam roller is adjusted to effect closure of the jaws and clamping of the wire, and said cam mechanism being adapted to adjust said cam member to allow downward movement of the cam roller during return movement of said carrier mechanism whereby said wire is released from said jaws.

3. In a machine for making hairpins, a guide-way, a wire carrier reciprocable on said guide-way and having wire clamping jaws, a cam stud supported on said carrier and controlling said jaws, a cam lever pivoted at one end and extending below the path of said carrier cam stud, a cam coöperating with the other end of said lever to effect raising and lowering thereof, said cam stud engaging with the upper surface of said lever, said lever being in raised position to hold its upper surface horizontally when said carrier is traveling inwardly and said jaws being then actuated by the cam stud to clamp the wire, said lever being lowered during the return stroke of the carrier to allow drop of the cam stud and release of the wire from the jaws.

4. In a machine for making hairpins, the combination of a wire straightener, a wire feeder, means for reciprocating said feeder, and means for effecting reciprocation of said straightener in synchronism with said feeder.

5. In a hairpin machine, the combination of a wire feeder, a swinging lever connected with said wire feeder, a wire straightener having frictional engagement with the wire operated on by said feeder, said straightener being free to shift bodily with the wire when said wire is fed by the feeder, means for holding the wire after such feeding, and a connection between said swinging lever and said straightener for effecting restoration of the straightener.

6. In a wire working machine, the combination with wire operating fields, of a wire feeder, means for reciprocating said feeder, said feeder having jaw mechanism adapted to close to grip the wire during inward travel of the feeder and to release the wire during outward travel thereof, a wire straightener having frictional engagement with the wire and adapted to reciprocate, said straightener being free to travel with the wire during shift of the wire by the feeder, means for holding the wire after such shifting thereof, and a connection between said feeder and straightener for restoring said straightener to its outer position.

7. In a wire working machine, the combination of a wire straightener, a reciprocating wire feeder for intermittently clamping and shifting the wire, said straightener and feeder being interconnected whereby said straightener is reciprocated with the feeder.

8. In a wire working machine, the combination of a wire straightener, a reciprocating wire feeder for intermittently clamping and shifting the wire, said straightener and feeder being interconnected whereby said straightener is reciprocated with the feeder, and means for rotating said straightener.

9. In a wire working machine, the combination of means for feeding endless wire, a spindle through which said wire passes, a bearing head on said spindle, a bearing frame for said head, blocks radially reciprocable on said head and pivoting wire cutting disk members, levers pivoted in said head and having their respective ends pivoted to said blocks, a cam hub reciprocable on said shaft and having cam surfaces for engaging with the outer ends of said levers, means for shifting said hub to cause rotation of the levers to bring the cutting flanges together to cut the wire passing through the spindle, and means for reciprocating said spindle to thereby bodily revolve the cutting disks around the wire.

10. In a wire working machine, the combination of a vertical guide frame, a supporting frame reciprocable in said guide frame, a looping tongue carried by said supporting frame, anvil members adapted to be disposed below said guide frame to cooperate with said looping tongue, a transversely reciprocable rod, a stationary top plate above the front end of said rod, a guide plate secured to the front end of said rod below said top plate, said guide plate having a guide groove adjacent its front end, said rod being normally in rear position to dispose the groove in said guide plate below said top plate, means for feeding a wire length into said guide groove, a spring secured to the guide plate for holding said wire length in said groove, means for shifting said guide rod to cause the guide plate to be carried forwardly to bring the guide groove beyond the front edge of the top plate and to bring the wire in said groove into the path of the looping tongue, said plate having a notch below the looping tongue, means for shifting the anvil members forwardly below the wire length and means for shifting the tongue supporting frame downwardly whereby said tongue will engage with the wire length to form a loop therein, and means for clamping said looped wire length against the anvil members during withdrawal of the tongue.

11. In a hairpin machine, the combination of means for cutting wire lengths, means for deflecting each length to form a loop, a spindle having a head and levers pivoted therein, said head having a diametral dovetailed groove across its upper end, opposed dovetailed blocks in said groove engaged respectively by the upper ends of said levers, jaw heads secured to the inner ends of said blocks, means for raising said spindle whereby a loop is received between said jaw heads, a rod within said spindle and means for raising said rod to carry its end between the ends of said levers to spread said levers to cause said jaw heads to clamp the loop, and means for rotating said spindle to cause twisting of the loop.

12. In a hairpin machine, the combination of means for cutting wire lengths, means for deflecting each length to form a loop, a spindle having a head and levers pivoted therein, said head having a diametral dovetailed groove across its upper end, opposed dovetailed blocks in said groove engaged respectively by the upper ends of said levers, jaw heads secured to the inner ends of said blocks, means for raising said spindle whereby a loop is received between said jaw heads, a rod within said spindle and means for raising said rod to carry its end between the ends of said levers to spread said levers to cause said jaw heads to clamp the loop, means for rotating said spindle to cause twisting of the loop, means for withdrawing said spindle from said loop after twisting thereof, an ejector tongue supported in said spindle head in alinement with the loop receiving space between said jaw members, and means for passing said loop through said space upon withdrawal of said spindle whereby to eject from said space a loop or any part thereof left during withdrawal of the spindle.

13. In a wire working machine, the combination of means for feeding endless wire, rotary cutting mechanism through which the wire passes, and means at each end of said cutting mechanism for securely clamping and holding the wire during operation of the cutting mechanism.

14. In a wire working machine, the combination of means for feeding endless wire, a rotary cutting frame having a passage therethrough for the wire, blocks radially reciprocable in said frame and cutter disks pivoted thereto, and cam mechanism for shifting said blocks toward each other to carry the cutting edges of the disks against the wire whereby said disks will rotate by their frictional engagement with the wire and the wire will be cut.

15. In a wire working machine, the combination of means for feeding endless wire, rotary cutting mechanism through which the wire passes, and independent means at each end of said cutting mechanism for simultaneously clamping and holding the wire during operation of the cutting mechanism.

16. In a wire working machine, the combination of means for feeding endless wire, cutting mechanism through which the wire passes, clamping mechanism positioned on one side of said cutting mechanism, and an auxiliary clamping mechanism for simultaneously engaging the wire upon the opposite side of said cutting mechanism.

In witness whereof, I hereunto subscribe my name this 17th day of October, A. D., 1913.

ISAAC HOWARD SISSON.

Witnesses:
 FRANKLIN A. SMITH,
 A. ERNEST POWELL.